US012488660B2

(12) United States Patent
Brown et al.

(10) Patent No.: US 12,488,660 B2
(45) Date of Patent: Dec. 2, 2025

(54) METHODS AND SYSTEMS FOR CONTENT MANAGEMENT

(71) Applicant: Comcast Cable Communications, LLC, Philadelphia, PA (US)

(72) Inventors: Gregg Brown, Philadelphia, PA (US); Stuart Kurkowski, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 304 days.

(21) Appl. No.: 17/741,154

(22) Filed: May 10, 2022

(65) Prior Publication Data

US 2023/0368620 A1   Nov. 16, 2023

(51) Int. Cl.
*G07F 17/32* (2006.01)
*H04N 21/4627* (2011.01)
*H04N 21/478* (2011.01)

(52) U.S. Cl.
CPC ...... *G07F 17/3288* (2013.01); *G07F 17/3227* (2013.01); *H04N 21/4627* (2013.01); *H04N 21/478* (2013.01)

(58) Field of Classification Search
CPC ............. G07F 17/3288; G07F 17/3227; G07F 17/323; H04N 21/4627; H04N 21/478
See application file for complete search history.

(56) References Cited

U.S. PATENT DOCUMENTS

| | | | | |
|---|---|---|---|---|
| 6,358,150 B1 * | 3/2002 | Mir | ...................... | G07F 17/3288 463/43 |
| 6,852,031 B1 * | 2/2005 | Rowe | ...................... | G07F 17/32 463/43 |
| 11,159,851 B2 | 10/2021 | Stern et al. | | |
| 2001/0031656 A1 * | 10/2001 | Marshall | ............. | G07F 17/3288 463/6 |
| 2001/0037211 A1 * | 11/2001 | McNutt | ............. | H04N 21/4781 348/E7.071 |
| 2011/0090898 A1 | 4/2011 | Patel et al. | | |
| 2020/0077138 A1 | 3/2020 | Sawyer et al. | | |

* cited by examiner

*Primary Examiner* — Kevin Y Kim
(74) *Attorney, Agent, or Firm* — Ballard Spahr LLP

(57) ABSTRACT

Methods and systems for content management are described. If programming content is distributed to viewers, signals such as markers are transmitted with the programming content. If a user device receives the marker, the use device may make a request to a rights management device. The rights management device may receive the request and determine an identifier associated with the request and an identifier associated with the marker. The rights management server may determine if the user device is authorized for supplemental features associated with the programming content.

55 Claims, 10 Drawing Sheets

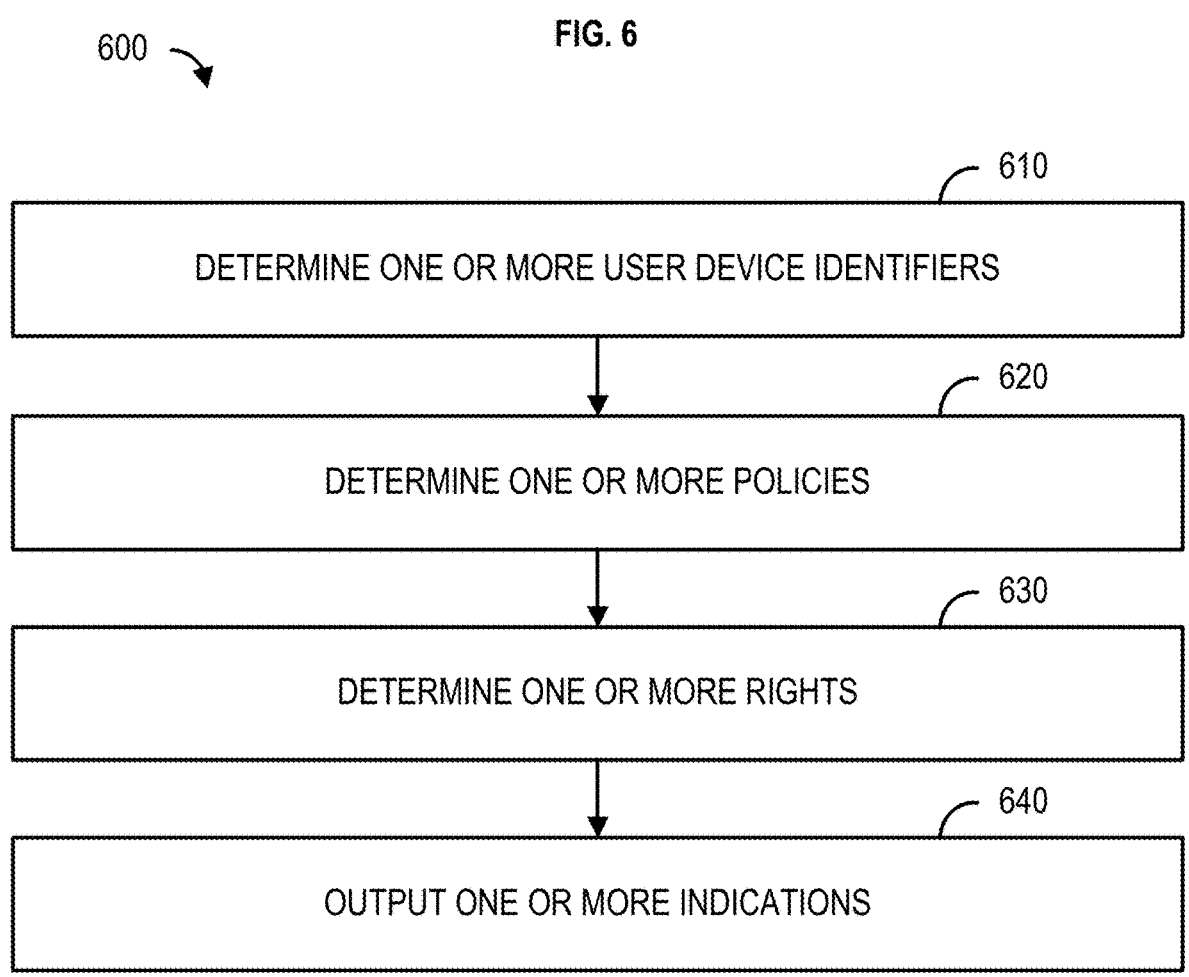

710 — DETERMINE ONE OR MORE USER DEVICE IDENTIFIERS

720 — DETERMINE ONE OR MORE APPLICATIONS

730 — SEND SIGNALING DATA

740 — CAUSE THE ONE OR MORE USER DEVICES TO ACTIVATE THE ONE OR MORE APPLICATIONS

METHODS AND SYSTEMS FOR CONTENT MANAGEMENT

BACKGROUND

As more of our daily lives move on-line, customers want to interact more and more with the content they consume. However, technical deficiencies and legal restrictions often prevent users from interacting with content (e.g., betting on a sports game as a consumer watches the game). This degrades the user experience.

SUMMARY

It is to be understood that both the following general description and the following detailed description are exemplary and explanatory only and are not restrictive. Methods and systems for content management are described. Content and one or more markers may be sent to a device and, based on receiving the content and/or the one or more markers, the device may send one or more messages configured to determine whether the device can access supplemental features associated with the content.

BRIEF DESCRIPTION OF THE DRAWINGS

The accompanying drawings, which are incorporated in and constitute a part of this specification, show examples and together with the description, serve to explain the principles:

FIG. 6 shows an example method;

FIG. 7 shows an example method;

DETAILED DESCRIPTION

Figure 1A:
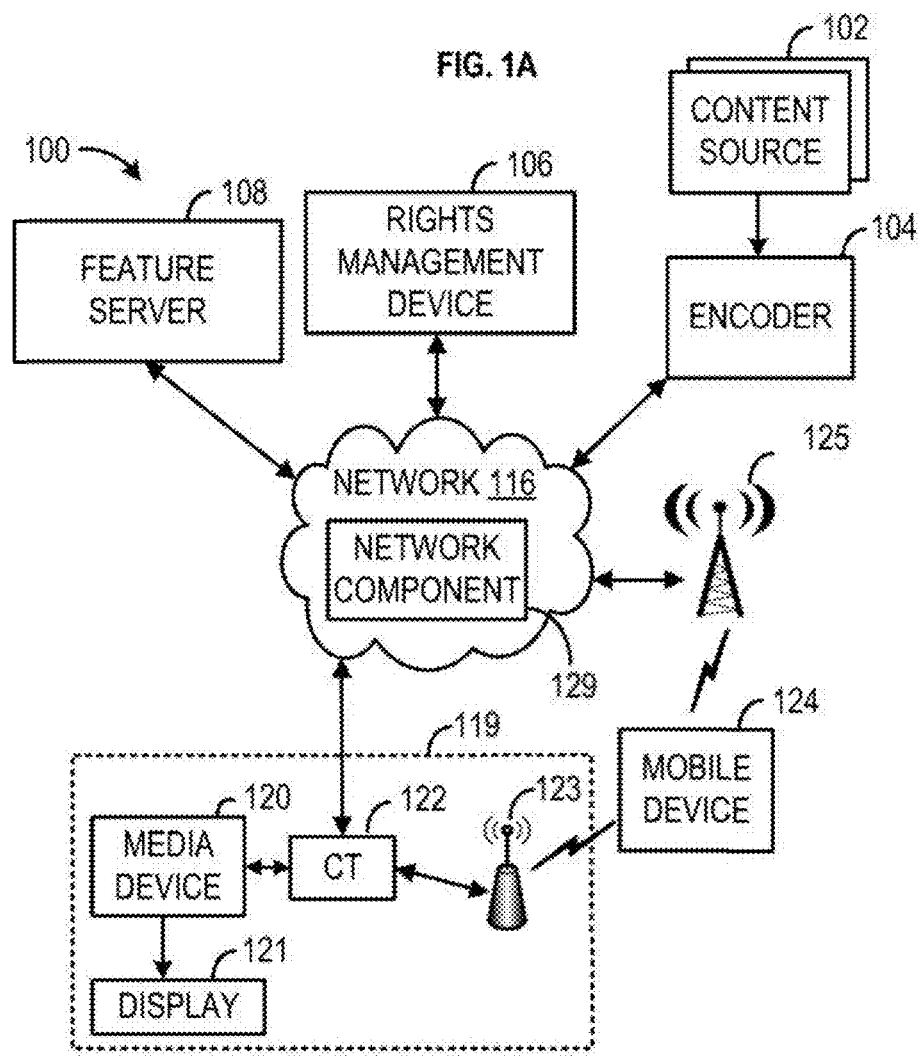
FIGS. 1A-1B show an example system for content management.

As used in the specification and the appended claims, the singular forms "a," "an," and "the" include plural referents unless the context clearly dictates otherwise. Ranges may be expressed herein as from "about" one particular value, and/or to "about" another particular value. If such a range is expressed, another configuration includes from the one particular value and/or to the other particular value. Similarly, if values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is to be understood that if combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information." Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic advertisement insertion data (.csv), Adobe® Photoshop® (.PSD) format or some other format for electronically storing text, graphics and/or other information whether such format is presently known or developed in the future. Content items may be any combination of the above-described formats.

This detailed description may refer to a given entity performing some action. It should be understood that this language may in some cases mean that a system (e.g., a computer) owned and/or controlled by the given entity is actually performing the action.

FIG. 1 shows a system 100 for content distribution. Those skilled in the art will appreciate that digital equipment and/or analog equipment may be employed. Those skilled in the art will appreciate that provided herein is a functional description and that the respective functions may be performed by software, hardware, or a combination of software and hardware.

The system 100 may comprise a content source 102, an encoder 104, a rights management device 106, a feature server 108, and/or a media device 120. Each of the content source 102, the encoder 104, the rights management device 106, the gaming serve 108, and/or the media device 120 can be one or more computing devices, and some or all of the functions performed by these components may at times be performed by a single computing device. The content source 102, the encoder 104, the rights management device 106, the feature server 108, and/or the media device 120 may be configured to communicate through a network 116. The network 116 may facilitate sending content from the content source 102 to the media device 120 (or other device) at a user location 119. The network 116 may facilitate sending advertisements from the rights management device 106 to the media device 120 (or other device) at the user location 119. The network 116 may be a content delivery network, a content access network, combinations thereof, and the like. The network may be managed (e.g., deployed, serviced) by a content provider, a service provider, combinations thereof, and the like. The network 116 may be an optical fiber network, a coaxial cable network, a hybrid fiber-coaxial network, a wireless network, a satellite system, a direct broadcast system, or any combination thereof. The network 116 can be the Internet. The network 116 may have a network component 129. The network component 129 may be any device, module, combinations thereof, and the like communicatively coupled to the network 116. The network component 129 may be a router, a switch, a splitter, a packager, a gateway, an encoder, a storage device, a multiplexer, a network access location (e.g., tap), physical link, combinations thereof, and the like.

The content source 102 may be configured to send content (e.g., video, audio, movies, television, games, applications, data, etc.) to one or more devices such as the encoder 104, a network component 129, a first access point 123, a mobile device 124, a second access point 125, and/or the media device 120. The content source may receive a content request from, for example, the media device 120 and/or the encoder 104 (e.g., on behalf of the media device 120 or another device). The content source 102 may be configured to send streaming media, such as broadcast content, video on-demand content (e.g., VOD), content recordings, combinations thereof, and the like. The content source 102 may be managed by third party content providers, service providers, online content providers, over-the-top content providers, combinations thereof, and the like. The content may be sent based on a subscription, individual item purchase or rental, combinations thereof, and the like. The content source 102 may be configured to send the content via a packet switched network path, such as via an IP based connection. The content may comprise a single content item, a portion of a content item (e.g., content fragment), a content stream, a multiplex that includes several content items, combinations thereof, and the like. The content may comprise one or more data packets. The content may be accessed by users via applications, such as mobile applications, television applications, STB applications, gaming device applications, combinations thereof, and the like. An application may be a custom application (e.g., by content provider, for a specific device), a general content browser (e.g., web browser), an electronic program guide, combinations thereof, and the like.

The content may comprise signaling data. The signaling data may be inserted into the content at the content source 102 or at the encoder 104. The signaling data may be inserted in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The signaling data may comprise one or more markers. For example, the signaling data may comprise Society of Cable and Television Engineers 35 (SCTE-35) markers and/or Society of Cable and Television Engineers 224 (SCTE-224) markers. The Society of Cable Telecommunications Engineers 35 (SCTE-35) and Society of Cable and Television Engineers 224 (SCTE-224) are hereby incorporated by reference in its entirety. The Society of Cable Telecommunications Engineers 30 (SCTE-30) and the Society of Cable Telecommunications Engineers 130 (SCTE-130) are also hereby incorporated by reference in their entirety.

The encoder 104 may receive the content. The encoder 104 may process the content and insert the one or more markers. The encoder 104 may generate a marker ID associated with the marker. The encoder 104 may generate the marker ID based on any parameter associated with the content, for example, a destination of the content. The encoder 104 may send, to the media device 120, marker and/or the marker ID. The marker may be sent to the media device 120 along with the content (e.g., from the content source 102). The marker may be sent to the media device 120 separate from the content. The marker may be sent to the media device 120 in a data packet. The marker ID may be inserted, by the encoder 104, into the SCTE-35 marker.

The content may be comprise or otherwise be associated with a content ID configured to identify the content. For example, the content may comprise one or more data packets, one or more content segments, or the like which may comprise the content ID. The content ID may be a string of characters, numbers, symbols, etc. The content ID may, for example, be a title or description of the content. The content may be associated with a content destination. The content destination may be any one or more devices of the system 100 or the like. For example, the content destination may be the media device 120. The content destination may be associated with a content destination ID. The content destination ID may be a MAC address or some other identifier associated with the one or more devices of system 100. For example, the content destination may be a MAC address or IP associated with the media device 120 and/or the second access point 125 (e.g., a headend or VDE). The content may comprise one or more data packets the one or more data packets may comprise one or more fields. The one or more fields may comprise a destination header configured to contain the destination ID.

For example, the content source 102 may receive a content request from the media device 120. The content request may comprise a device ID associated with the media device 120. The content source 102 may determine the device ID associated with the media device 120 is the destination ID and insert, into the destination field of the one or more data packets. Similarly, in another embodiment, the encoder or some other device may make a content request on behalf of the media device.

The encoder 120 receive the content and determine the content ID and the destination ID. The encoder 120 may send a restriction information request to the rights management device 106. The restriction information request may comprise the content ID and the destination ID. The rights management device 106 may determine, based on the content ID and the destination ID, restriction information associated with either or both the content ID and/or the destination ID. The restriction information may be configured to indicate one or more policies associated with either or both of the content ID or destination ID, one or more timing restrictions associated with either or both of the content ID or destination ID, one or more location restrictions associated with either or both of the content ID or destination ID, one or more supplemental features associated with either or both of the content ID or destination ID. For example, the restriction information may indicate that given user device (e.g., media device 120) is authorized to enable one or more supplemental features. For example, the restriction information may indicate the media device 120 is allowed (e.g., by virtue of location) to gamble on a sporting event. Based on determining the media device 120 is authorized to enable the one or more supplemental features, the encoder may encode supplemental feature data into the content. For example, the encoder 104 may encode betting related information into the video transport stream. For example, the encoder 104 may encode an interface into the video transport stream, wherein the interface is configured to receive one or more user inputs (e.g., user placed bets). Similarly, the encoder 104 may encoder signaling data (e.g., one or more markers) configured to cause the media device 120 to open (e.g., "launch") one or more applications. For example, the encoder 104 may encode a SCTE-224 marker with a flag or other indicator configured to cause the media device 120 (e.g., a set-top-box) to launch one or more locally stored applications and/or one or more remote applications.

The media device 120 may receive the content and the one or more markers. The media device 120 may comprise a user device such as an STB, computer, mobile phone, combinations thereof, and the like. The media device 120 may be a digital streaming device, a gaming device, a media storage device, a digital recording device, a computing device, a mobile computing device (e.g., a laptop, a smartphone, a tablet, etc.), combinations thereof, and the like. The media device 120 may determine the marker in the content. For example, the media device 120 may parse the SCTE-35 messages carried within the MPEG transport stream of the content. For example, the media device 120 may determine the XML namespace prefix identifying the marker as an SCTE-35 marker. For example, the media device 120 may identify a cue_identifier_descriptor and/or a cue_stream_type value associated with the marker such as "splice_insert" "splice_null," "splice_schedule" combinations thereof, and the like. A person skilled in the art will appreciate that the aforementioned examples are non-limiting.

The one or more markers may comprise one or more beacons. The one or more beacons may be configured to cause one or more user devices (e.g., the media device 120) that receive the one or more markers to send one or more beacon calls. The one or more beacon calls may comprise messages sent from a device based on receiving the one or more beacons. The one or more beacon calls may comprise, for example, one or more feature queries, one or more content output indications, combinations thereof, and the like. For example, the one or more beacons may comprise one or more HTTP request methods (e.g., GET, POST, etc.). The one or more beacons may comprise one or more uniform resource locators (URLs) configured to cause the media device 120 to send the one or more feature queries.

The one or more feature queries may comprise one or more content identifiers (e.g., a title, a channel, a content identifier, combinations thereof, and the like). The one or more feature queries may comprise timing data (e.g., a time at which the one or more markers were received, a time at which the content was received, a time at which the content was output, a time at which the content was requested by the media device 120, combinations thereof, and the like). The one or more feature queries may comprise location information (e.g., a location of the media device 120 such as latitude and longitude, a geographic region, a syscode, a jurisdiction, combinations thereof, and the like). The one or more feature queries may comprise one or more user device identifiers. The one or more user device identifiers may be associated with the one or more user devices (e.g., the media device 120). For example, the one or more user device identifiers may comprise, for example, a unique string or characters, letters, numbers, symbols, etc. For example, the device identifier may comprise an OUI, a MAC address, an IP address, model number, a brand name, or any other identifier.

Similarly, based on receiving the marker, the media device 120 may send a content output indication to the rights management device 106. The content output indication may comprise at least one of the marker ID, the marker timestamp, a media device ID, and/or a content ID, the location information, the timing data, and/or the one or more user device identifiers. The media device ID may comprise a unique identifier associated with the media device 120. For example, the media device ID may comprise a MAC address. The MAC address may be associated with a geographic ID (e.g., a "syscode"). The syscode may comprise a four digit code determined by National Cable Communications (NCC) to represent a specific geography available for advertisement insertion. The syscode may represent a specific geographic zone, grouping of zones, a cable interconnect or grouping of cable interconnects, combinations thereof, and the like. The content ID may comprise a unique ID associated with the content. For example, the content ID may comprise at least one of a channel ID, a frequency ID, a content title, a television network name, combinations thereof, and the like.

Figure 1B:
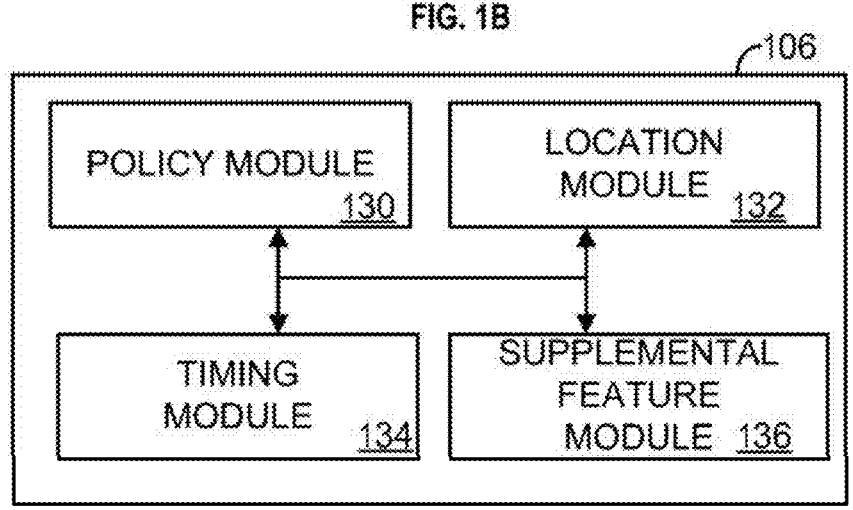

The rights management device 106 may receive the one or more feature queries. The rights management device 106 may comprise one or more computing devices (e.g., servers) configured to store, cause storage, determine, cause determination, send, and/or cause sending of data. As shown in FIG. 1B, the rights management device 106 may comprise a policy module 130, a location module 132, a timing module 134, and alternative content module 136.

The rights management device 106 may receive the one or more feature queries from the media device 120. The rights management device 106 may receive the one or more feature queries from a plurality of media devices. Each feature query of the one or more content feature queries may comprise one or more timestamps. The one or more timestamps may indicate when a given user device (e.g., the media device 120) of the one or more user devices sent the one or more feature queries. If the rights management device 106 receives the one or more feature queries, for each of the feature queries of the one or more feature, the rights management device 106 may determine at least one of the marker ID, the content ID, the one or more content output indications timestamp, and the media device ID.

The rights management device 106 may determine, based on receiving the one or more feature queries an availability of one or more supplemental features for the media device 120. The availability of the one or more supplemental features may be determined based on one or more policies. For example, a first policy of the one or more policies may relate to in-game betting associated with content while a second policy of the one or more policies may relate to content blackouts in one or more geographic regions. The one or more policies may be associated with one or more user device identifiers, one or more content identifiers, one or more geographic regions, one or more time periods, one or more demographic profiles (e.g., age ranges), combinations thereof, and the like.

The policy module 130 may be configured to store one or more content policies. The one or more content policies may comprise, for example, a content gaming policy. The one or more content policies may be configured to indicate one or more geographic regions, one or more user devices, one or more content items, one or more rules/regulations, combinations thereof, and the like associated with one or more supplemental content features. The one or more supplemental content features may comprise one or more interactive content features. For example, the one or more content policies may comprise geographic content output data, subscription output data, timing output data, blackout data, combinations thereof, and the like. For example, the one or more policies may indicate that the content is associated with one or more supplemental features. For example, the one or more policies may indicate the one or more supplemental features are associated with one or more geographic regions. The policy module 130 may determine a violation of the one or more content policies. For example, the policy module 130 may receive a feature query. The policy module 130 may determine one or more of the location information in the feature query, the user device identifier in the feature query, or other information in the feature query. The policy module 130 may compare, for example, the location information and the user device identifier to a supplemental feature policy. The supplemental feature policy may indicate that one or more supplemental features are authorized in a first geographic region. The location information in the content output indication may indicate the user device is located in the first geographic region. As such, the policy module 130 may determine the user device in the first geographic region may receive/execute/generate/or otherwise process one or more supplemental features.

The location module 132 may be configured to process the location data in the feature query. The location module 132 may be configured to determine whether the location information in the feature query complies with a content policy stored in the policy module 130. For example, the location module 132 may determine the location information in the feature indicates a second geographic region. The location module may query the policy module 136 to determine whether the second geographic region is listed on the content policy as a geographic region where the supplemental feature is authorized or not. For example, the location module may determine the second geographic region is a region where the supplemental feature is not authorized.

The timing module 134 may be configured to process the timing information in the feature query. For example, the timing module 134 may determine whether or not the timing data in the feature query indicates that the content was output by the user device during a prohibited window. For example, the timing module 134 may query the policy module to determine a timing parameter associated with the content policy. The timing module 134 may compare the timing information in the feature query with the timing parameter associated with a given policy to determine if a violation of the policy has occurred.

The supplemental feature module 136 may be configured to receive, send, store, generate, determine, or otherwise process one or more supplemental features associated with the content. For example, the supplemental feature module 136 may be configured to send one or more messages configured to cause the media device to activate one or more supplemental content features. For example, the one or more supplemental content features may comprise in-game betting features (e.g., one or more user interfaces configured to facilitate wagering on one or more content items), one or more content interaction features (e.g., one or more trick play features such as rewind, fast-forward, pause, record, volume change, or any change in content such as changing a resolution associated with content). For example, the supplemental feature module 136 may be configured to send and/or receive one or more SCTE-224 message configured to activate an application (e.g., an applet) on the media device 120. Additionally and/or alternatively, the supplemental feature module 136 may be configured to cause the media device 120 to download one or more software applications configured to facilitate one more user interactions with the content.

Returning to the components of system 100, the network 116 may comprise a network component 129. The network component 129 may be any device, module, combinations thereof, and the like communicatively coupled to the network 116. The network component 129 may also be a router, a switch, a splitter, a packager, a gateway, an encoder, a storage device, a multiplexer, a network access location (e.g., tap), physical link, combinations thereof, and the like. The media device 120 may comprise a demodulator, decoder, frequency tuner, combinations thereof, and the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may implement one or more applications, such as content viewers, social media applications, news applications, gaming applications, content stores, electronic program guides, combinations thereof, and the like. Those skilled in the art will appreciate that the signal may be demodulated and/or decoded in a variety of equipment, including the communication terminal 122, a computer, a TV, a monitor, or a satellite dish. The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), combinations thereof, and the like. The communication terminal 122 may be configured for communication with the network 116 via a variety of protocols, such as IP, transmission control protocol, file transfer protocol, session initiation protocol, voice over IP (e.g., VoIP), combinations thereof, and the like. The communication terminal 122, for a cable network, may be configured to facilitate network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to facilitate access to the network 116 to devices configured with a compatible wireless radio, such as a mobile device 124, the media device 120, the display device 121, or other computing devices (e.g., laptops, sensor devices, security devices). The first access point 123 may be associated with a user managed network (e.g., local area network), a service provider managed network (e.g., public network for users of the service provider), combinations thereof, and the like. It should be noted that in some configurations, some or all of the first access point 123, the communication terminal 122, the media device 120, and the display device 121 may be implemented as a single device.

The user location 119 is not necessarily fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, combinations thereof, and the like. The mobile device 124 may communicate with a variety of access points (e.g., at different times and locations or simultaneously if within range of multiple access points), such as the first access point 123 or the second access point 125.

Figure 2:
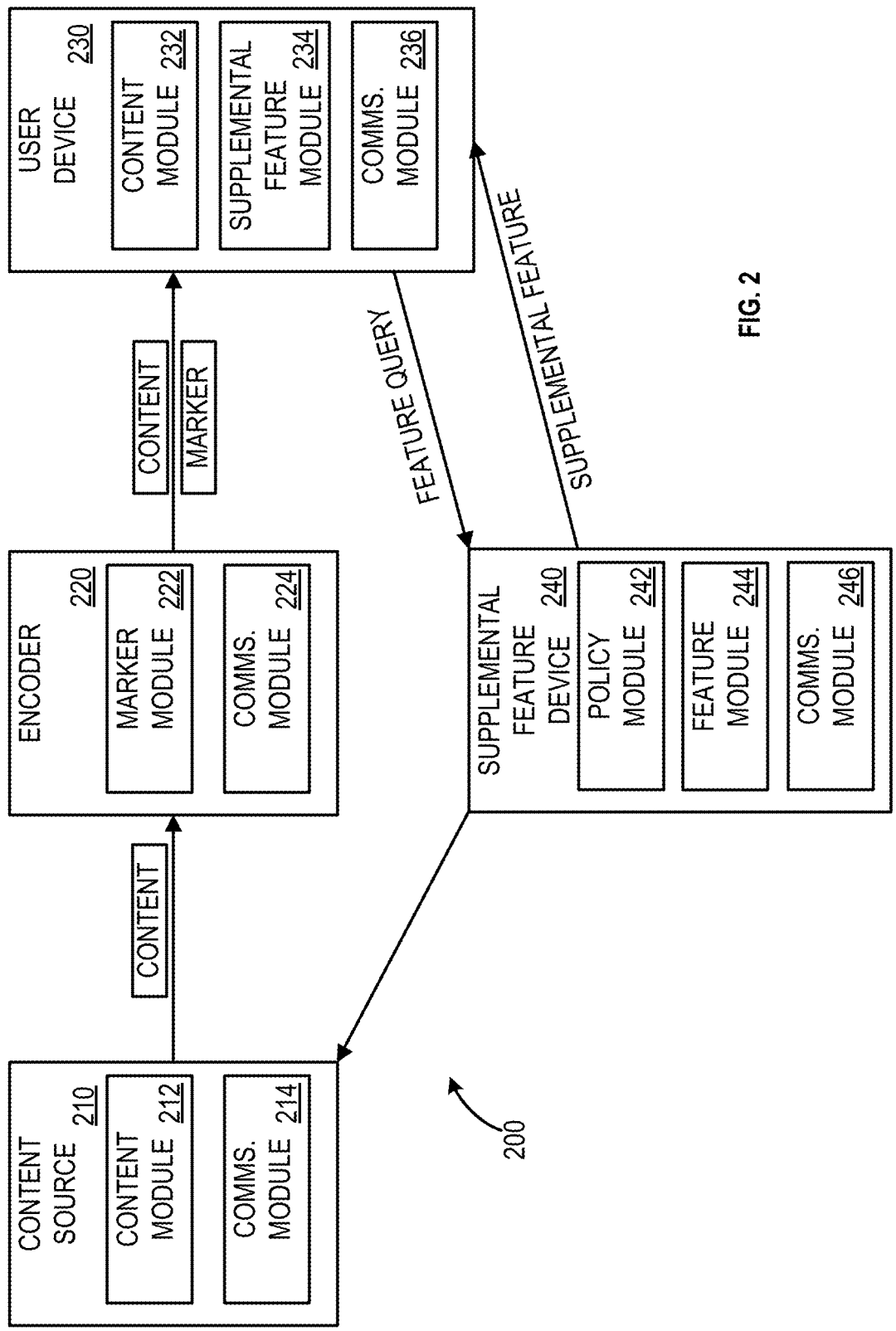
FIG. 2 shows an example system for content management.

FIG. 2 shows an example system 200. The system 200 may comprise a content source 210 (e.g., the content source 102), an encoder 220 (e.g., the encoder 104), a user device 230 (e.g., the media device 120), and a policy device 240 (e.g., the rights management device 106). The content source 210 may send content to the encoder 220. The encoder 220 may receive the content and insert, into the content, one or more markers. The one or more markers may comprise one or more beacons configured to cause the user device 230 to send, to the policy device 240, one or more content output indications.

The content source 210 may comprise a content module 212 and a communications module 214. The communications module 214 may be configured to receive, send, store, generate, or otherwise process data. The content module 212 may be configured to receive, send, store, generate, or otherwise process content. For example, the content source 210 may be configured to send content stored in the content module 212. The content module 212 may receive live content (e.g., from a content feed (not pictured)). For example, the content feed may be a camera configured to capture image data and generate a camera feed. The content source 210 may be a computing device configured to receive the camera feed and process it for distribution. For example, the content source 210 may send the content to the encoder 220.

The encoder 220 may receive the content. The encoder 220 may comprise a marker module 222 and a communications module 224. The communications module 224 may be configured to receive, send, store, generate, or otherwise process data. The marker module 222 may be configured to insert, into the content, one or more markers. The one or more markers may comprise, for example, one or more SCTE-35 markers and/or one or more SCTE-224 markers. The encoder 220 may send the content and the one or more markers to the user device 230. The one or more markers may comprise one or more beacons.

The user device 230 may receive the content and the one or more markers. For example, the user device 230 may comprise a set-top-box (STB), a mobile device (e.g., a smartphone), a computer, a laptop, combinations thereof, and the like. The user device 230 may comprise a content module 232, a supplemental feature module 234, and a communication module 236. The communications module 236 may be configured to receive, send, store, generate, or otherwise process data. The content module 232 may be configured to receive, send, store, generate, or otherwise process content. The content module 232 may be configured to output the content. For example, the user device 230 may be configured to cause display of the content via a display device. The user device 230 may comprise the display device and/or the display device may be separate from the user device 230. The user device 230 may receive the content and determine the one or more markers. Based on determining the one or more markers, the user device may send one or more feature queries. For example, the user device may receive a SCTE-35 marker and may send, via a SCTE-224 signal (e.g., an out-of-band signal), the one or more feature queries. For example, the user device 230 may receive the SCTE-35 marker and may send, via a SCTE-244 or SCTE-250 message, the one or more feature queries. Similarly, an upstream device may receive the SCTE-35 marker and may implement (e.g., enforce) a policy for one or more downstream devices. The one or more feature queries may comprise, for example, one or more user device identifiers associated with the user device, location data associated with the user device, timing data associated with the content and/or timing data associated with the one or more markers (e.g., a time at which the user device received the content, a time at which the user device output the content, a time at which the user device received the one or more markers). The one or more feature queries may comprise location data associated with the content and/or location data associated with the user device 230. For example, the location data associated with the content may indicate a geographic location within which the content is to be distributed. The location data may indicate a geographic region within which the content originated (e.g., a live-feed). The one or more feature queries may comprise one or more content identifiers such as a title, channel, production company, copyright owner, distributor, content source, combinations thereof, and the like.

The user device 230 may send the one or more feature queries to the supplemental feature device 240. The supplemental feature device 240 may comprise the rights management device 106 (e.g., a linear rights management (LRM) device) and/or the feature server 108 of FIG. 1. The supplemental feature device may comprise a policy module 242, a feature module 244, and a communications module 246. The communications module 246 may be configured to receive, send, store, generate, or otherwise process data. The supplemental feature device 240 may determine, based on the one or more feature queries, one or more supplemental features to make available to the user device 230. Additionally and/or alternatively, the supplemental feature device 240 may determine that no supplemental features are available to the user device 230. For example, the policy module 242 may be configured to store one or more policies and determine whether the one or more policies are applicable to the content sent to the user device and/or applicable to the user device 230.

The one or more policies may comprise policy location information (e.g., a geographic region or other location where a given policy is or is not applicable), an applicability indication (e.g., applicable, not applicable), timing information (e.g., one or more policy start times, one or more policy end times), content information (e.g., one or more content titles, one or more content sources, one or more channels, one or more frequencies, one or more copyright owners, one or more distribution rights, one or more content locators such as a uniform resource locator (URL), combinations thereof, and the like). The one or more policies may indicate one or more rules (e.g., rules, regulations, laws, etc.) associated with one or more geographic regions (e.g., one or more jurisdictions). For example, a first piece of content may comprise a sports game (e.g., a live broadcast of an NBA game) and a first policy of the one or more policies may indicate gambling on the first piece of content is allowed in a first jurisdiction associated with a first user device while gambling on the first piece of content is not allowed in a second jurisdiction associated with a second user device. The one or more policies may indicate trick play (e.g., fast-forward) of the content is allowed in a first geographic region but not allowed in a second geographic region, or allowed for a first group of user devices but not for a second group of user devices.

The feature module 244 may be configured to send and receive supplemental feature data to and from the user device 230 and/or any other device of FIGS. 1A-1B, FIG. 2, FIG. 3, and/or FIG. 7. The feature module may send, based on determining a policy applies to the user device 230, one or more supplemental features messages to the user device 230. The one or more supplemental feature messages may be configured to cause the user device to activate one or more supplemental features (e.g., via the supplemental feature module 234). The one or more supplemental feature messages may comprise one or more SCTE-224 messages. The one or more supplemental features may comprise, for example, one or more functionalities associated with the content. The one or more functionalities may comprise for example, one or more gaming functionalities, one or more social media functionalities, one or more transactional functionalities such as making purchases, one or more content functionalities such as one or more trick play functionalities, one or more recording functionalities, one or more editing functionalities, combinations thereof, and the like.

For example, the user device 230 may send the one or more feature queries to the supplemental feature device 240. Based on the information in the one or more feature queries, the supplemental feature device 240 may determine the user device is located in Las Vegas Nevada and is receiving and/or outputting an Atlanta Hawks NBA game. The supplemental feature device 240 may determine, based on the one or more policies, that gambling on the Atlanta Hawks game is allowed in Las Vegas. Based on determining that gambling on the Atlanta Hawks game is allowed in Las Vegas, the feature module 244 may send a first supplemental feature message to the user device 230. The first supplemental feature message may be configured to cause the user device to launch a gambling applet (e.g., via the supplemental feature module 234) on the user device 230. The gambling applet may be configured to send and receive data. For example, the gambling applet may be configured to receive and display information related to the Atlanta Hawks game. The gambling applet may be configured to receive one or more user inputs and send and receive one or more subsequent supplemental feature messages based thereon. For example, the gambling applet may display odds related to the Atlanta Hawks game and may receive one or more wagers via a user interface associated with the gambling applet. The supplemental feature module may send the one or more wagers to the supplemental feature device where they may be processed by the feature module 244.

Figure 3:
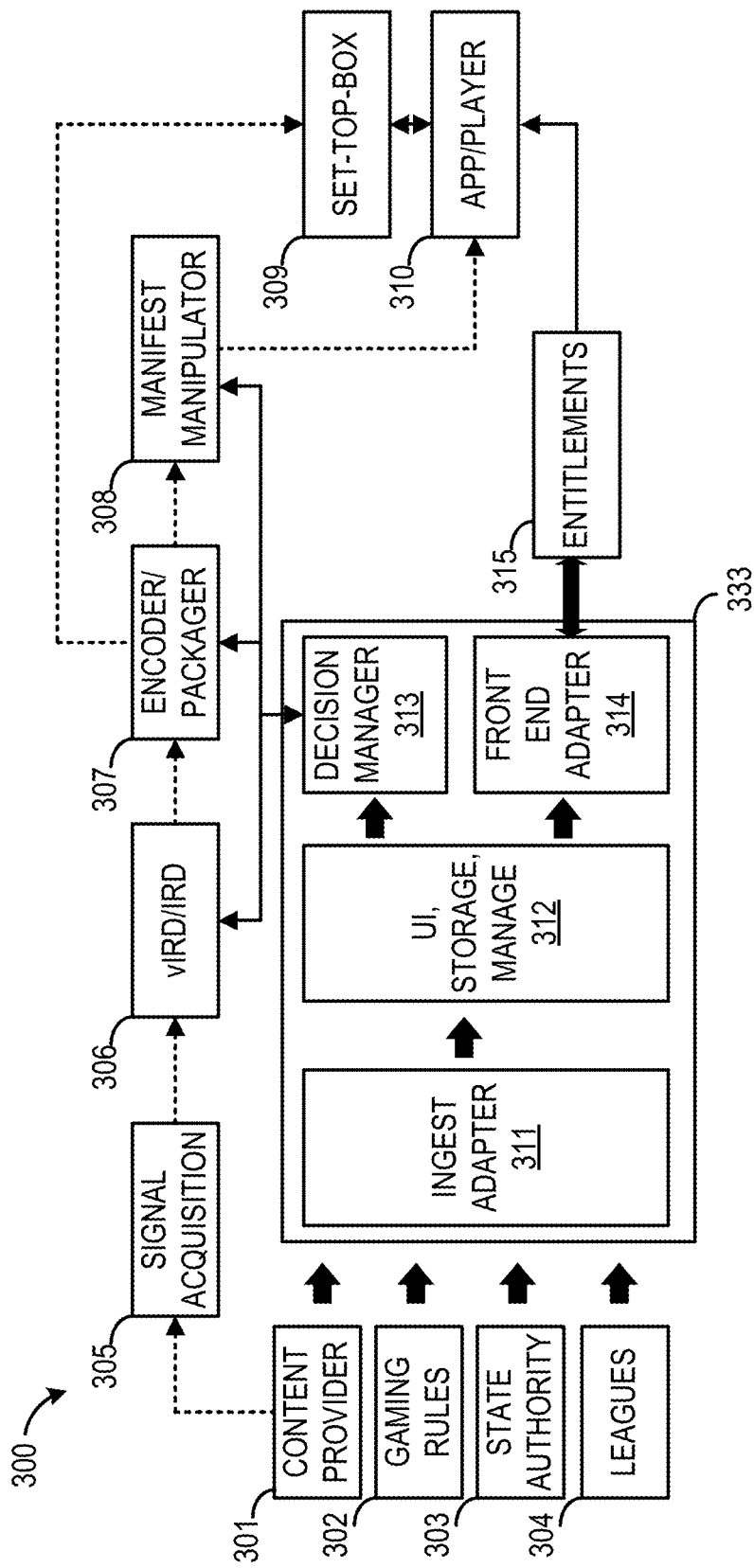
FIG. 3 shows an example system for content management.

FIG. 3 shows an example system 300 for content management and gaming. The system 300 may comprise a content provider 301, a gaming rules database 302, a state authority database 303, a leagues database 304, a signal acquisition device 305, a virtual integrated receiver-decoder/integrated receiver-decoder (vIRD/IRD) 306, and encoder/packager 307, a manifest manipulator 308, a set-top-box 309 (e.g., the media device 120/the user device 230), an application/player 310, a linear rights manager 333 comprising an ingest adapter 311, a linear rights manager (LRM) 312, a decision manager 313, a front-end adapter 314, and an entitlements database 315. The components of the system may be configured to be in communication through a network such as the network 116.

In operation, any one or more of the content provider 301, the gaming rules database 302 (e.g., a gaming authority such as the Nevada Gaming Control Board or any other similar authority), the state authority database 303 (e.g., a state legislature or other body), any one or more gaming leagues databases 304 or wagering organizations (e.g., the National Basketball Association, National Hockey League, Major League Baseball, the National Football League, the National Thoroughbred Racing Association, any e-Sports league), may provide rules to the ingest adapter 311. For example, the one or more rules may comprise an indication whether or not a league allows betting, a region allows betting, if a betting window is only available during this time period, if betting is only allowed for a specific age group or device, etc. In operation, content providers may send video (and/or other data) for distribution to consumers (e.g., the set-top-box 309).

The LRM 333 may aggregate and ingest the one or more policies, and convert them into an event schedule notification interface (ESNI) or digital rights management (DRM) standard configured to apply the one or more policies. For example, the LRM 333 may ingest a gambling policy associated with an NBA basketball game and convert the gambling policy to the SCTE-224 format. The LRM 333 may store the aggregated rules in storage (e.g., cloud storage). The decision manager 313 may determine the one or more SCTE-35 markers in the content and may determine to apply one or more rules based on the content ID and/or the destination ID. The decision manager 313 may trigger the one or more supplemental features (e.g., a user interface overlay to be displayed over the content, wherein the user interface overlay is configured to facilitate placing wagers on an underlying gaming event). The LRM 333 may be configured to aggregate the one or more policies and, in response to a query from the encoder/packager 307 comprising the content ID and/or the destination ID, determine one or more supplemental features associated with the content and/or the destination (e.g., restriction information). The LRM 333 may send the restriction information indicating the one or more supplemental features (and/or the availability or non-availability thereof) to the encoder/packager 307. The encoder/packager 307 may, based on the restriction information, encode supplemental feature signaling data into the outbound stream bound for the destination. For example, by taking the gaming data from all the source inputs (League, Location, Gaming Authorities, etc.), converting this data into a SCTE-224 metadata feed (e.g., one or more SCTE-224 markers) and then integrating that SCTE-224 metadata feed into an outbound stream (e.g., the transport stream), key stakeholders such as content providers and other services may activate an in-game betting pop-up/applet/layover/functionality. Thus, at the start of a gaming event, a SCTE-224 Decision Engine (e.g., the decision manager 313) may respond with the playout rights, to include if in-game betting is allowed or not based on the destination ID, the content ID, local rules, etc. If betting is allowed, the player may a flag as in-game betting allowed. So if the user clicks on the in-gaming betting app the player knows that it can present an in-game betting application to the user.

For example, the one or more SCTE-224 markers may be configured to cause the media device 120 to launch one or more applications. The one or more applications may be associated with the one or more supplemental features. The media device 120 may launch the one or more applications based on receipt of the one or more SCTE-224 markers. For example, the one or more SCTE-224 markers may comprise one or more supplemental feature indicators in one or more fields of the one or more SCTE-224 markers. The one or more supplemental feature indicators may indicate one or more applications associated with the underlying content, subscription information associated with the underlying content, one or more device types, location information, or the like. The media device 120 may, for example, based on the one or more applications associated with the underlying content identified in the SCTE-224 marker, determine if an application of the one or more applications is currently installed on, or otherwise available to (e.g., via download or web interface by virtue of a subscription) the media device 120. If so, the media device 120 may launch (or prompt a user to launch) the application. As described in greater detail with respect to FIGS. 4-5B, the application may comprise an overlay or other interface configured to display data associated with the underlying content (e.g., gambling data) and receive one or more user inputs. (e.g., by virtue of other data which may identify an application associated with a supplemental feature.

Additionally and/or alternatively, LRM 333 could determine at the moment a user tries to access the in-game betting pop-up (e.g., based on a received user input), whether that user device (e.g., based on location, class of device, subscription information etc. . . . ) is allowed to access the pop-up. Additionally and/or alternatively, beacon technology may be incorporated to auto-correct or provide real-time audit capabilities to ensure the betting rules are being enforced. For example, when there is content eligible for betting available, a beacon may be added to the playout instructions in a similar fashion to an ad beacon at the start of the ad (e.g., in the or more SCTE-35 markers). The beacon may be configured to trigger a beacon call a beacon call. Likewise, anyone not watching the content, (i.e., they are on slate or alternate content), does not trigger a beacon call and therefore it may be determined that user device is adhering to the policy. In this manner, one or more beacons may be collected and analyzed (e.g., compared against device restriction and a policy footprint determine if anyone is watching gaming content in violation of the policy). The one or more beacon calls may comprise information about the content, a location associated with the media device, an output indication, one or more feature queries, an impression count, combinations thereof, and the like. The one or more beacon calls may comprise one or more output indications. The one or more output indications may comprise one or more content identifiers (e.g., a title, a channel, a content identifier, combinations thereof, and the like). The one or more output indications may comprise timing data (e.g., a time at which the one or more markers were received, a time at which the content was received, a time at which the content was output, a time at which the content was requested by the media device 120, combinations thereof, and the like). The one or more content output indications may comprise location information (e.g., a location of the media device 120 such as latitude and longitude, a geographic region, a syscode, a jurisdiction, combinations thereof, and the like). The one or more output indications may comprise one or more user device identifiers. The one or more user device identifiers may be associated with the one or more user devices (e.g., the media device 120). For example, the one or more user device identifiers may comprise, for example, a unique string or characters, letters, numbers, symbols, etc. For example, the device identifier may comprise an OUI, a MAC address, an IP address, model number, a brand name, or any other identifier.

Figure 4:
FIG. 4 shows an example interface.

FIG. 4 shows an example interface 400. The example interface 400 may comprise an electronic program guide, content guide, menu, another similar interface, combinations thereof, and the like. The interface 400 may be configured to indicate one or more supplemental features associated with one or more content items. For example, betting restriction data can be used to proactively determine games that a particular user/device will or will not be allowed to gamble on, and insert one or more indicators into a user guide to label such games. For example, a user may be able to view today's games and also scroll ahead in the guide to next weekend's games (or any other time), and see which games the user can or cannot gamble on.

The interface 400 may comprise one or more fields, panes, areas, etc. The one or more fields may comprise, for example, a first field 401, a second field 403, one or more timing fields 405, one or more source fields 406 and 407, and one or more content fields 408A-D associated with one or more content items. The one or more timing fields 405 may be configured to indicate when content is available (e.g., airing or otherwise available or accessible to a user). For example, the one or more timing fields may indicate a start time, duration, end time, combinations thereof, and the like associated with available content items. The timing field 405 indicates content that may be available today, tomorrow, next week, or any time in the future. The one or more channel indicators 406 and 407 may be configured to indicate a channel or other means of accessing the available content. For example, channel indicator 406 indicates content available on ESPN while channel indicator 407 indicates content available on NBC. The one or more timing indicators 405 and the one or more channel indicators 406 and 407 may be dynamic (e.g., updated as time and content offerings change). The interface 400 may be configured as a navigable interface configured to receive one or more user inputs and update, based on the one or more user inputs, an output associated with the interface. For example, the interface 400 may be configured as a navigable menu wherein the navigable menu displays available content and may be configured to receive a selection of a content item of the available content from the user, via the user device. Based on the user input, the interface 400 may be updated to output information about the selected content. For example, in FIG. 4, a content item associated with content field 408A has been selected (as indicated by a variance in color, however, the indication may be represented in any manner).

The first field 401 may be configured to display primary content data associated with the selected content and supplemental feature data 402 associated with selected content. The primary content data may comprise information such as a title or subject matter associated with the selected content. For example, the first field 401 indicates The primary content data may indicate a title, subject matter, air time (or any other availability), content source, content owner, combinations thereof, and the like. For example, the first field 401 indicates an NBA Basketball game between the Atlanta Falcons and Washington Wizards is airing nationwide. The second field 403 may be configured to output (e.g., display) additional data associated with the selected content item. For example, the second field 403 in FIG. 4 shows an image of an NBA basketball player on the Atlanta Hawks. The second field 403 may output a video preview, one or more still images, one or more thumbnails, the actual selected content, one or more hyperlinks associated with the selected content, combinations thereof, and the like.

The supplemental feature data 402 may indicate one or more supplemental features associated with the content. For example, the supplemental feature data 402 indicates the Atlanta vs. Washington game is associated with in-game betting, social media sharing, and AR/VR enhancement. The supplemental feature data 402 may indicate one or more supplemental feature icons 402A-D. The one or more supplemental feature icons 402A-D may correspond to or otherwise be associated with one or more supplemental features and may be output on the interface 400 (e.g., in the area indicated by 402, the one or more fields indicating the one or more available content items, etc. . . . ). For example, content item 408A ATL vs. WSH (the Atlanta Hawks vs. Washington Wizards), is associated with three icons (in-game betting, social media sharing, and AR/VR), while the LAL vs. LAC (Las Angeles Lakers vs. Las Angeles Clippers) game (associated with field 408B) is associated with only the AR/VR icon, NYC vs. BOS is associated with the AR/VR icon and the social media sharing icon, while a sporting event featuring teams from St. Louis and Chicago is associated only with in-game betting (as indicated by the dollar sign). The supplemental feature data 402 may indicate one or more geographic regions associated with the one or more supplemental features. The one or more geographic regions may indicate where the one or more supplemental features are available and whether or not the one or more supplemental features are where the user is (e.g., by virtue of where a set-top-box, user device, or any other device is located).

Figure 5A:
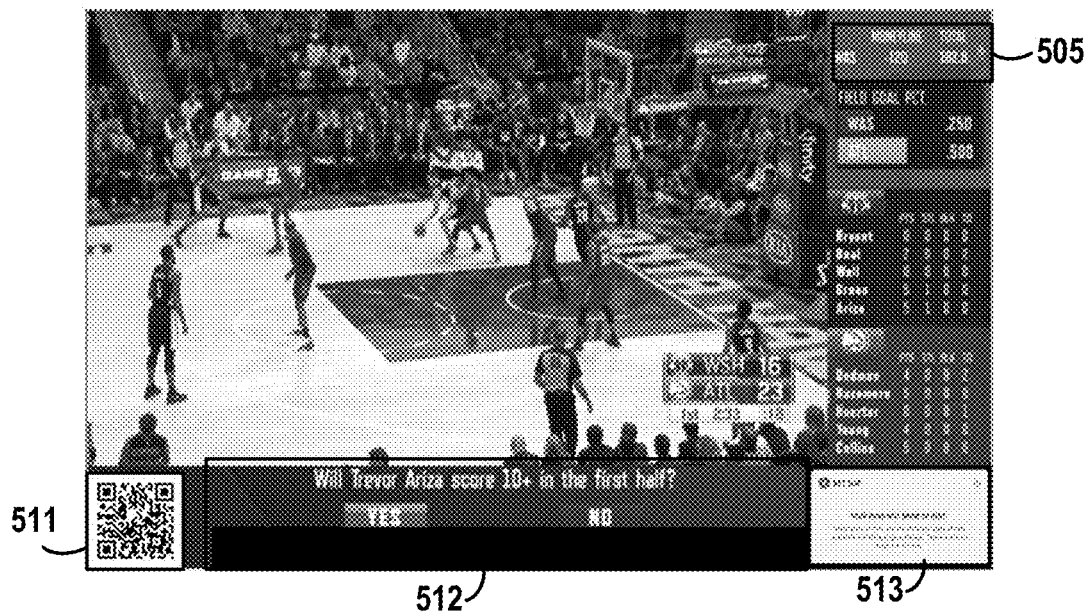
FIGS. 5A-5B show example user interfaces.
Figure 5B:

FIGS. 5A-5B show example interfaces 500 and 550. Interfaces 500 and 550 show both content and the one or more supplemental features. For example, interface 500 is displaying, as primary content, the Atlanta vs. Washington NBA Basketball game (e.g., the content item selected in field 408A of FIG. 4). The interface may display information such as one or more player lineups, field goal percentages, and/or any other data associated with the primary content (e.g., statistical information associated with a sporting event). The interface 510 may be configured to output one or more applications (e.g., applets, widgets, etc. . . . ) associated with the one or more supplemental features. For example, interface 510 shows a QR code 511. The QR code 511 may be scannable by an AR/VR device and thereby facilitate the provision of the AR/VR supplemental feature (e.g., as indicated in FIG. 4). Similarly, interface 510 shows a betting application 512 comprising one or more selectable options (e.g., "YES" and "NO"). The betting application may be configured to facilitate in-game betting during sporting events. Similarly, the interface 510 shows a moneyline associated with the game 513 and a bet slip 514 which may display bets a user has placed and information associated therewith.

The interface 520 in FIG. 5B also shows primary content and one or more supplemental features. The primary content in FIG. 5B is also basketball. The interface 520 comprises a gambling window 521 configured to display information about the game such as one or more point spreads, one or more moneylines, one or more win percentages associated therewith as well as a win percentage 522 configured to indicate how likely a given team is to win. The gambling window 521 in interface 520 comprises a bet button 522. The bet button 522 may be configured as a selectable option which a user may selected (via a user device such as a remote control or a smart phone configured with a complimentary application). For example, selecting the bet button may launch an applet on the interface 520. The interface 520 also shows a QR code 523. The QR code 523 may be configured to cause a user device such as a smart phone to launch one or more applications. FIGS. 5A-5B show sports content but could it is to be appreciated the content could be any type of content including movies, television shows, public addresses, advertising, combinations thereof, and the like.

FIG. 6 shows a flowchart of a method 600 for content management. The method 400 may be carried out on any one or more of the devices described in FIGS. 1A-1B, FIG. 2, FIG. 3, and/or FIG. 10. At 610, a computing device may determine one more user device identifiers associated with one or more user devices. For example, the computing device may be an encoder (e.g., the encoder 104). The computing device may determine the one or more user device identifiers based on receiving content destined for the one or more user devices. For example, the computing device may receive one or more content segments and/or one or more markers and determine, based on data in the one or more content segments and/or the one or more markers, user devices that have requested the content. The content may comprise audio and/or video content. For example, the content may comprise on-demand content, streaming content, pay-per-view content, combinations thereof, or the like. The content may comprise one or more content segments. The content may comprise the one or more markers. The one or more markers may comprise a SCTE-35 marker and/or a SCTE-224 marker, or the like. The one or more user devices may comprise one or more set-top-boxes (STBs), a mobile device such as a smartphone, a computer, combinations thereof, and the like. The computing device may comprise a linear rights management (LRM) device.

At 620, the computing device may determine, based on the one or more user device identifiers, one or more supplemental content features. The one or more supplemental content features may comprise, for example, one or more gaming features. Determining the one or more supplemental content features may comprise determining, based on the one or more user device identifiers, location data associated with the one or more user devices. Determining the one or more supplemental content features may comprise determining, based on the location data, one or more gaming policies associated with the location data. For example, the location data may indicate one or more geographic location, one or more jurisdictions, or the like. The computing device may determine, for example, by querying a database, whether wagering on the content (e.g., gambling on a sporting event) is allowed in the one or more jurisdictions.

At 630, one or more supplemental feature access rights may be determined. The one or more supplemental feature access rights may be associated with one or more supplemental content features. The one or more supplemental content features may comprise, for example, one or more gaming features. Determining the one or more supplemental content feature access rights may comprise determining, based on the one or more user device identifiers, location data associated with the one or more user devices. Determining the one or more supplemental content feature access rights may comprise determining, based on the location data, one or more gaming policies associated with the location data. For example, the location data may indicate one or more geographic location, one or more jurisdictions, or the like. The computing device may determine, for example, by querying a database, whether wagering on the content (e.g., gambling on a sporting event) is allowed in the one or more jurisdictions.

At 640, one or more indicators may be generated. The one or more indicators may be associated with the one or more supplemental feature access rights. The one or more indicators may be configured to indicate the one or more supplemental feature access rights. The one or more indicators may comprise text or one or more images configured to indicate whether or not the one or more user devise has access to the one or more supplemental content features. The one or more indicators may comprise one or more electronic programming guides (EPGs), menus, or any other indicator. The one or more indicators may comprise one or more selectable hyperlinks.

The method may comprise causing display of the one or more indicators. The method may comprise receiving, via one or more user interfaces, one or more user inputs. The one or more user inputs may comprise one or more selections of the one or more selectable hyperlinks. The method may comprise causing, based on a selection of the one or more selectable hyperlinks, display of a web interface. The web interface may be configured to receive one or more wagers.

FIG. 7 shows a flowchart of a method 700 for content management. The method 700 may be carried out on any one or more of the devices described in FIGS. 1A-1B, FIG. 2, FIG. 3, and/or FIG. 10. At 710, a computing device may determine one more user device identifiers associated with one or more user devices. The computing device may comprise, for example, the encoder 104. The computing device may determine the one or more user device identifiers based on receiving content destined for the one or more user devices. For example, the computing device may receive one or more content segments and/or one or more markers and determine, based on data in the one or more content segments and/or the one or more markers, user devices that have requested the content. For example, the content may comprise one or more data packets. The one or more data packets may comprise one or more fields. A field of the one or more fields may be populated with a destination ID such as a MAC address or an IP address associated with a user device that requested the content. The content may comprise audio and/or video content. For example, the content may comprise on-demand content, streaming content, pay-per-view content, combinations thereof, or the like. The content may comprise one or more content segments. The marker may comprise a SCTE-35 marker and/or a SCTE-224 marker, or the like. The one or more user devices may comprise one or more set-top-boxes (STBs), a mobile device such as a smartphone, a computer, combinations thereof, and the like. The computing device may comprise a linear rights management (LRM) device.

At 720, the computing device may determine, based on the one or more user device identifiers, one or more supplemental content features. The one or more supplemental content features may comprise, for example, one or more gaming features. Determining the one or more supplemental content features may comprise determining, based on the one or more user device identifiers, location data associated with the one or more user devices. Determining the one or more supplemental content features may comprise determining, based on the location data, one or more gaming policies associated with the location data. For example, the location data may indicate one or more geographic location, one or more jurisdictions, or the like. The computing device may determine, for example, by querying a database, whether wagering on the content (e.g., gambling on a sporting event) is allowed in the one or more jurisdictions.

At 730, supplemental content data may be sent to the one or more user devices. The supplemental content data may be sent to the one or more user devices via one or more SCTE-224 messages. The supplemental content data may comprise data associated with the content. For example, the supplemental content data may comprise wagering data (e.g., odds or other wagering data) associated with the content. For example, the supplemental content data may comprise one or more odds (e.g., fractional, decimal, money-line), one or more over-unders, one or more favorites, one or more prop-bets, or any other wagering data.

At 740, the computing device may cause the one or more user devices to activate the one or more supplemental content features. The one or more supplemental content features may comprise one or more applications, one or more interfaces, one or more browsing sessions, combinations thereof, and the like. For example, causing the one or more user devices to activate the one or more supplemental content features may comprise causing the one or more user devices to launch the one or more applications. The one or more applications may be configured to receive, via the one or more user interface elements, one or more user inputs. For example, the one or more user inputs may comprise one or more wagers or the like. Causing the one or more user devices to activate the one or more supplemental content features may comprise sending one or more SCTE-224 messages to the one or more user devices.

The method may comprise receiving, from the one or more user devices, the one or more user inputs. The method may comprise sending, based on the one or more user inputs, one or more gaming actions to a feature server. The feature server may be configured to receive the one or more gaming actions and determine one or more payout tables.

Figure 8:
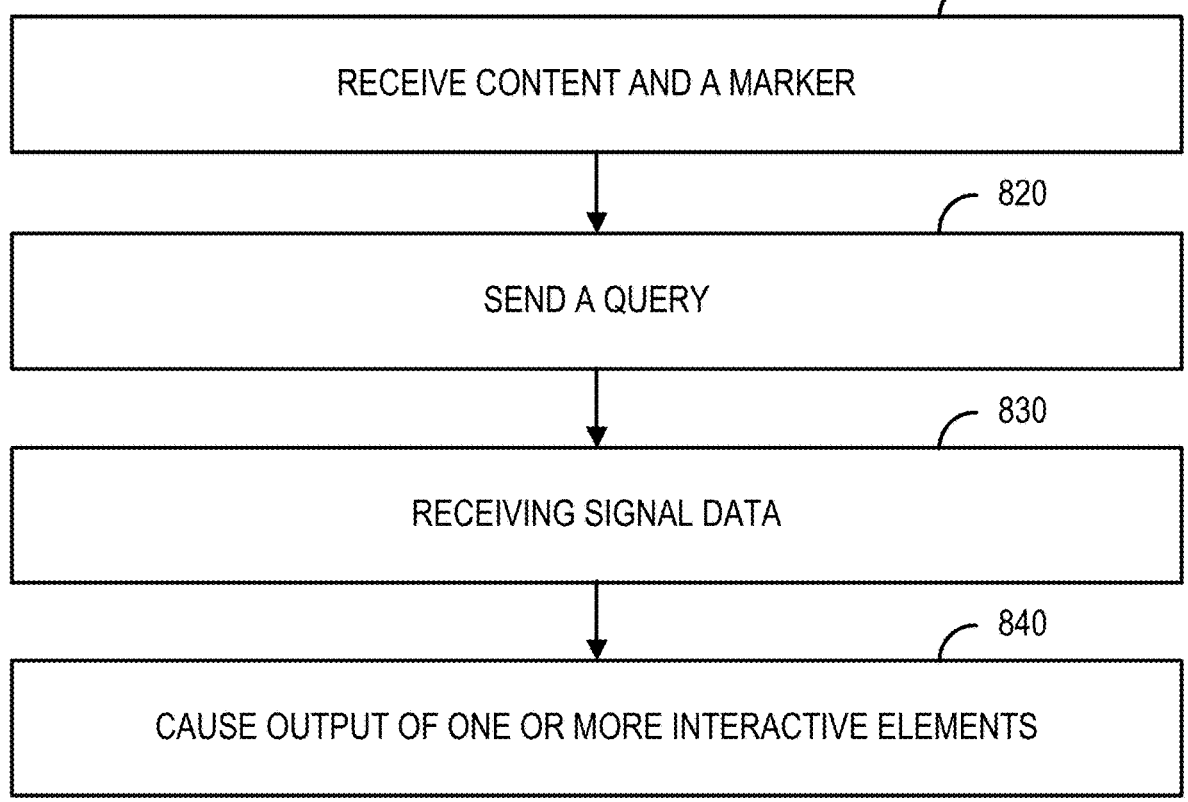
FIG. 8 shows an example method.

FIG. 8 shows an example method 800. The method 800 may be carried out on any one or more of the devices described in FIGS. 1A-1B, FIG. 2, FIG. 3, and/or FIG. 10. At step 810, a user device may receive content and a marker. The user device may comprise a cell phone, smart phone, television, laptop computer, desktop computer, combinations thereof, and the like. The user device may be the media device 120. The content may comprise audio and/or video content. For example, the content may comprise on-demand content, streaming content, pay-per-view content, combinations thereof, or the like. The content may comprise one or more content segments. The marker may comprise a SCTE-35 marker and/or a SCTE-224 marker, or the like. The user device may comprise a set-top-box (STB), a mobile device such as a smartphone, a computer, combinations thereof, and the like.

At 820, the user device may send a supplemental data request. The user device may send the supplemental data request based on the marker. For example, the marker may be configured to cause the user device to send the supplemental data request. The supplemental data request may comprise location information associated with the user device. The supplemental data request may comprise a user device identifier associated with the user device. The user device identifier may comprise, for example, an organizationally unique identifier (OUI), a manufacturer identifier, a media access control (MAC) address, an IP address, any other identifier, combinations thereof, and the like. The user device may send the supplemental data request to a computing device such as the gaming server, the rights management device, or the like.

At 830, the user device may receive an activation signal. The user device may receive the activation signal based on the supplemental data request. The activation signal may be configured to cause the user device to activate one or more supplemental content features. the one or more supplemental content features may comprise additional features associated with the content such as additional functionality. For example, the additional functionality may be configured to facilitate the sending and receiving of supplemental data such as wagers.

At 840, the user device may display one or more interactive interface elements. The one or more interactive interface elements may comprise, for example, a gaming interface configured to receive one or more user inputs (e.g., one or more wagers) and send one or messages associated with the one or more user inputs.

The method may comprise receiving, via the one or more interactive interface elements, one or more user inputs. The method may comprise sending, based on the one or more user inputs, one or more gaming commands. The method may comprise receiving updated content. The method may comprise updating, based on the updated content, the one or more interactive interface elements.

Figure 9:
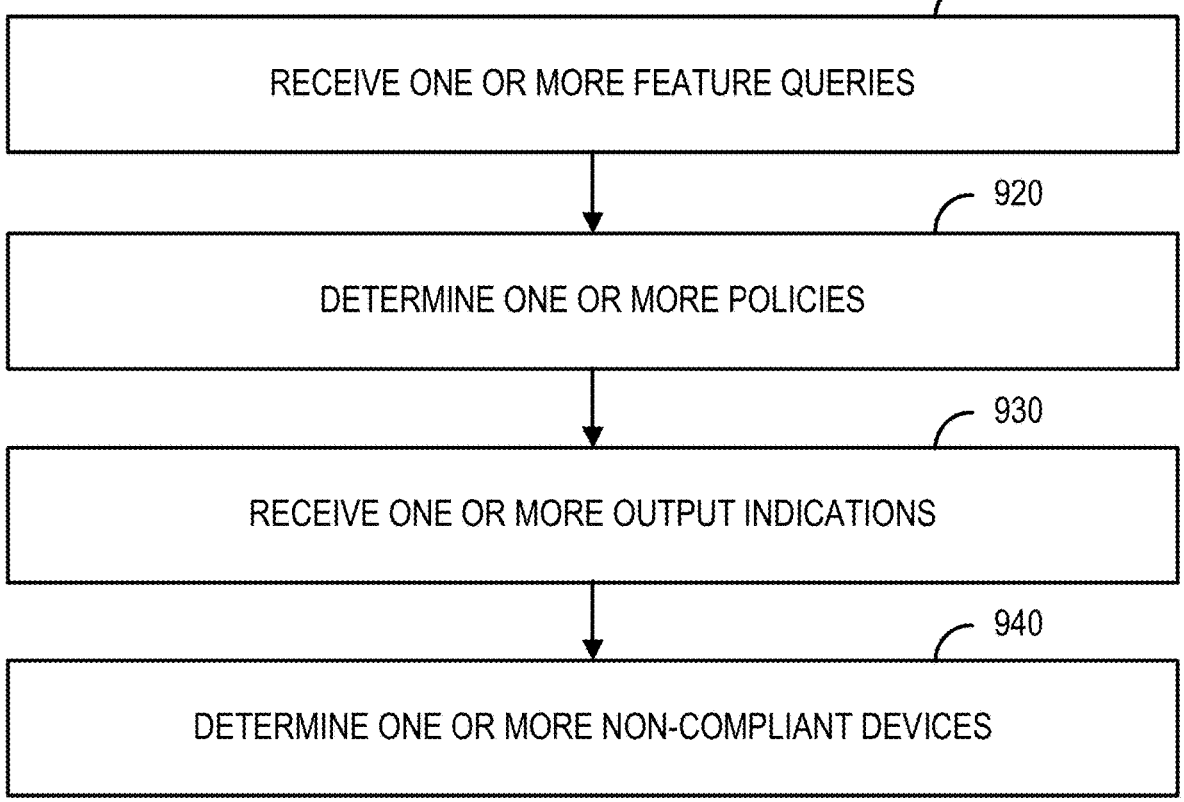
FIG. 9 shows an example method.

FIG. 9 shows an example method 900. The method 900 may be carried out on any one or more of the devices described in FIGS. 1A-1B, FIG. 2, FIG. 3, and/or FIG. 10. For example, the method 900 may be carried out on a linear rights management device such as the LRM 333. At step 910, the LRM may receive one or more supplemental feature queries. For example, the one or more supplemental feature queries may be received from an encoding device such as the encoder 104 and/or the encoder/packager 307. The one or more supplemental feature queries may comprise one or more content IDs and one or more destination IDs as described herein. The one or more supplemental feature queries may be configured to determine one or more supplemental features associated with underlying content. For example, if the underlying content is a sporting event or other content which may be suited for gambling, the one or more supplemental features may comprise gambling applications, gambling data, gambling interfaces, combinations thereof, and the like.

At 920, the LRM may determine one or more policies. The LRM 333 may determine the one or more policies based on the one or more content IDs and/or the one or more destination IDs. The one or more policies may indicate one or more rules (e.g., rules, regulations, laws, etc.) associated with one or more pieces of content (e.g., content IDs), one or more devices (e.g., device identifiers), one or more device types, device classes, user profiles, one or more geographic regions (e.g., one or more jurisdictions), combinations thereof, and the like. For example, a first piece of content may comprise a sports game (e.g., a live broadcast of an NBA game) and a first policy of the one or more policies may indicate gambling on the first piece of content is allowed in a first jurisdiction associated with a first user device while gambling on the first piece of content is not allowed in a second jurisdiction associated with a second user device. The one or more policies may indicate trick play (e.g., fast-forward) of the content is allowed in a first geographic region but not allowed in a second geographic region, or allowed for a first group of user devices but not for a second group of user devices.

At 930, the LRM 333 may receive one or more output indications. The one or more output indications may indicate one or more times at which the one or more markers were received, a time at which the content was received, a time at which the content was output, one or more times a supplemental feature was accessed, launched, or otherwise interacted with, one or more times at which the content was requested by the media device 120, combinations thereof, and the like. The one or more content output indications may comprise location information (e.g., a location of the media device 120 such as latitude and longitude, a geographic region, a syscode, a jurisdiction, combinations thereof, and the like). The one or more output indications may comprise one or more user device identifiers. The one or more user device identifiers may be associated with the one or more user devices (e.g., the media device 120). For example, the one or more user device identifiers may comprise, for example, a unique string or characters, letters, numbers, symbols, etc. For example, the device identifier may comprise an OUI, a MAC address, an IP address, model number, a brand name, or any other identifier.

At 940, the LRM 333 may determine one or more devices not in compliance with the one or more policies. For example, the LRM 333 may determine one or more user devices are outputting content in violation of the one or more policies and/or the one or more non-compliant user devices have launched or otherwise accessed one or more supplemental features in violation of the one or more policies. For example, the LRM 333 may compare a first device identifier in a first output indication with a first list of device identifiers associated with a first policy and determine the first device identifier is not included in the first list. For example, a first output indication may indicate that a first user device has launched a first gambling application associated with first underlying content. The first user device may be located in a first location (e.g., a first jurisdiction).

The method may further comprise determining one or more user devices that are in compliance with the one or more policies. For example, the LRM 333 may compare second device identifier, content ID, destination ID, or the like to a second list of authorized device identifiers and determine the second device identifier is included in the second list.

Figure 10:
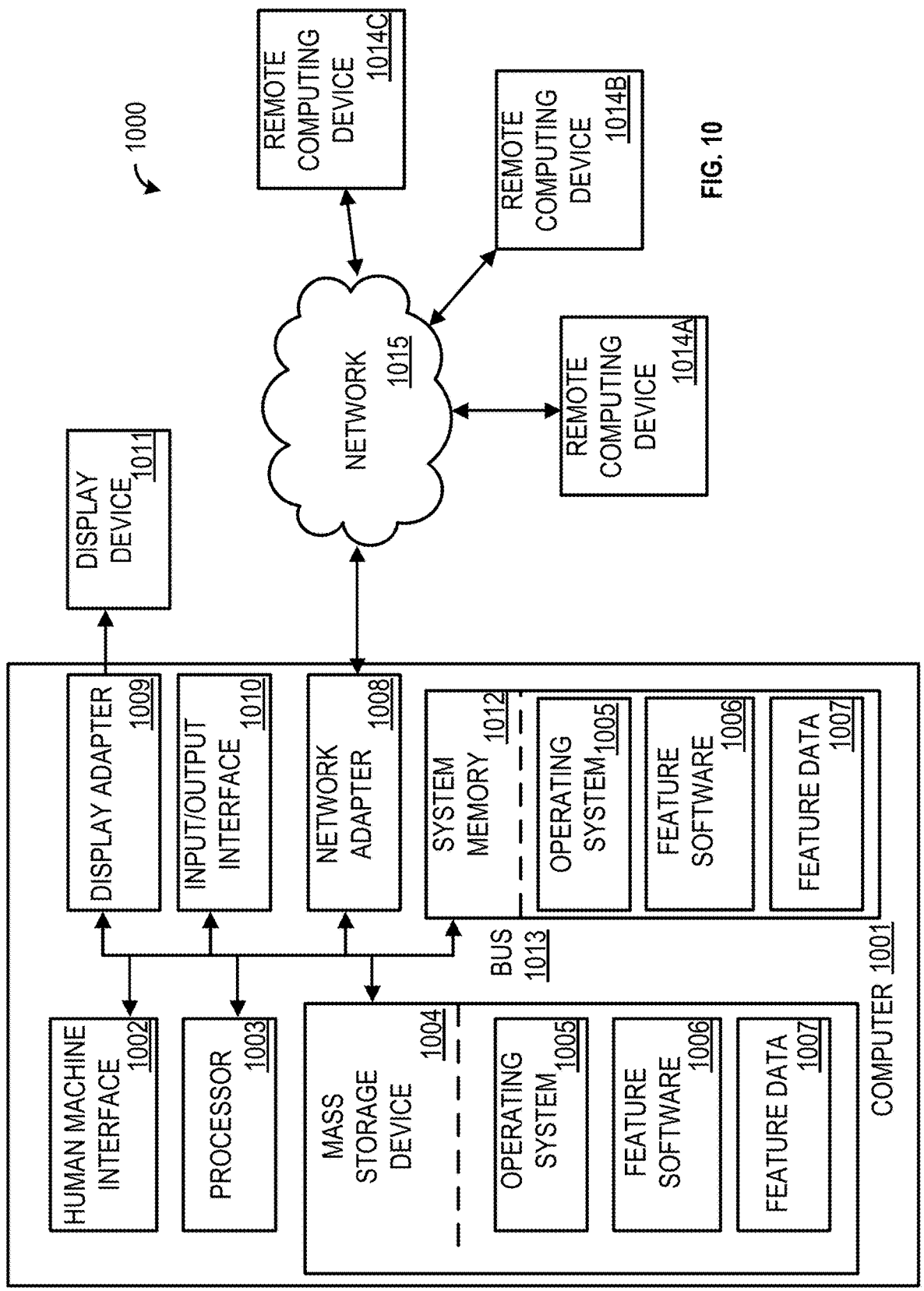
FIG. 10 shows an example system for content management.

FIG. 10 shows a system 1000 for content management. The media device 120, the display device 121, the communication terminal 122, the mobile device 124, the advertisement server 106, the content source 102, the encoder 102, and/or the network component 129 of FIG. 1 may be a computer 1001 as shown in FIG. 10. The user device 202, the network device 204, the content device 206, and/or the computing device 208 of FIG. 2 may be a computer 801 as shown in FIG. 10. The computer 1001 may comprise one or more processors 1003, a system memory 1012, and a bus 1013 that couples various system components including the one or more processors 1003 to the system memory 1012. In the case of multiple processors 1003, the computer 1001 may utilize parallel computing. The bus 1013 is one or more of several possible types of bus structures, including a memory bus or memory controller, a peripheral bus, an accelerated graphics port, or local bus using any of a variety of bus architectures.

The computer 1001 may operate on and/or comprise a variety of computer readable media (e.g., non-transitory). The readable media may be any available media that is accessible by the computer 1001 and may comprise both volatile and non-volatile media, removable and non-removable media. The system memory 1012 has computer readable media in the form of volatile memory, such as random access memory (RAM), and/or non-volatile memory, such as read only memory (ROM). The system memory 1012 may store data such as the feature data 1007 and/or program modules such as the operating system 1005 and the feature software 1006 that are accessible to and/or are operated on by the one or more processors 1003. The machine learning module may comprise one or more of the feature data 1007 and/or the feature software 1006.

The computer 1001 may also comprise other removable/non-removable, volatile/non-volatile computer storage media. FIG. 10 shows the mass storage device 1004 which may facilitate non-volatile storage of computer code, computer readable instructions, data structures, program modules, and other data for the computer 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 1004, such as the operating system 1005 and the feature software 1006. Each of the operating system 1005 and the feature software 1006 (or some combination thereof) may comprise elements of the program modules and the feature software 1006. The feature data 1007 may also be stored on the mass storage device 1004. The feature data 1007 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 1015.

A user may enter commands and information into the computer 1001 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1003 via a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

The display device 1011 may also be connected to the bus 1013 via an interface, such as the display adapter 1009. It is contemplated that the computer 1001 may comprise more than one display adapter 1009 and the computer 1001 may comprise more than one display device 1011. The display device 1011 may be a monitor, an LCD (Liquid Crystal Display), light emitting diode (LED) display, television, smart lens, smart glass, and/or a projector. In addition to the display device 1011, other output peripheral devices may be components such as speakers (not shown) and a printer (not shown) which may be connected to the computer 1001 via the Input/Output Interface 1010. Any step and/or result of the methods may be output (or caused to be output) in any form to an output device. Such output may be any form of visual representation, including, but not limited to, textual, graphical, animation, audio, tactile, and the like. The display device 1011 and computer 1001 may be part of one device, or separate devices.

The computer 1001 may operate in a networked environment using logical connections to one or more remote computing devices 1014A, B, C. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1001 and a remote computing device 1014A, B, C may be made via a network 1015, such as a local area network (LAN) and/or a general wide area network (WAN). Such network connections may be through the network adapter 1008. The network adapter 1008 may be implemented in both wired and wireless environments. Such networking environments are conventional and commonplace in dwellings, offices, enterprise-wide computer networks, intranets, and the Internet.

Application programs and other executable program components such as the operating system 1005 are shown herein as discrete blocks, although it is recognized that such programs and components reside at various times in different storage components of the computing device 1001, and are executed by the one or more processors 1003 of the computer. An implementation of the feature software 1006 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the quantity or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   determining, based on received video content, one or more user device identifiers associated with one or more user devices to receive the video content;
   determining, based on the video content, one or more in-game betting policies associated with the video content;
   determining, based on the one or more in-game betting policies, one or more in-game betting rights associated with the one or more user device identifiers; and
   causing, based on the one or more in-game betting rights, output of one or more indications of in-game betting availability on one or more user interfaces associated with the video content.

2. The method of claim 1, wherein the one or more user devices comprise one or more set top boxes.

3. The method of claim 1, wherein determining the one or more in-game betting policies associated with the video content comprises determining one or more wagering games associated with the video content.

4. The method of claim 1, wherein determining the one or more in-game betting policies comprises determining one or more location-based gambling restrictions.

5. The method of claim 1, wherein the one or more indications comprise one or more icons associated with the one or more in-game betting rights.

6. The method of claim 1, further comprising causing the one or more user devices to launch one or more in-game betting applications.

7. The method of claim 1, further comprising:
   receiving, from the one or more user devices, an in-game betting access request; and
   causing, based on the in-game betting access request, the one or more user devices to download one or more applications.

8. A method comprising:
   determining, based on video content for one or more user devices, one or more user device identifiers;
   determining, based on the one or more user device identifiers, one or more in-game betting applications associated with the video content;
   sending, based on the one or more in-game betting applications, in the video content for the one or more user devices associated with the one or more user device identifiers, one or more content markers to the one or more user devices; and
   causing, based on the one or more content markers, the one or more user devices to activate the one or more in-game betting applications.

9. The method of claim 8, wherein the one or more user device identifiers are associated with one or more gaming policies.

10. The method of claim 8, wherein the one or more in-game betting applications comprise one or more applets.

11. The method of claim 8, wherein sending the one or more content markers comprises determining, based on the one or more user device identifiers, location data associated with the one or more user device identifiers.

12. The method of claim 8, wherein sending the one or more content markers comprises sending one or more SCTE messages to the one or more user devices.

13. The method of claim 8, wherein causing the one or more user devices to activate the one or more in-game betting applications comprises causing the one or more user devices to launch one or more interfaces.

14. The method of claim 8, further comprising receiving, from the one or more user devices, one or more user inputs associated with the one or more in-game betting applications.

15. One or more non-transitory computer-readable media storing processor executable instructions thereon, which, when executed by at least one processor cause the at least one processor to:
   determine, based on received video content, one or more user device identifiers associated with one or more user devices to receive the video content;
   determine, based on the video content, one or more in-game betting policies associated with the video content;
   determine, based on the one or more in-game betting policies, one or more in-game betting rights associated the one or more user device identifiers; and
   cause, causing, based on the one or more in-game betting rights, output of one or more indications of in-game betting availability on one or more user interfaces associated with the video content.

16. The one or more non-transitory computer-readable media of claim 15, wherein the one or more user devices comprise one or more set top boxes.

17. The one or more non-transitory computer-readable media of claim 15, wherein the processor executable instructions that, when executed by the at least one processor, cause the at least one processor to determine the one or more in-game betting policies associated with the video content further cause the at least one processor to determine one or more wagering games associated with the video content.

18. The one or more non-transitory computer-readable media of claim 15, wherein the processor executable instructions that, when executed by the at least one processor, cause the at least one processor to determine the one or more in-game betting policies, further cause the at least one processor to determine one or more location-based gambling restrictions.

19. The one or more non-transitory computer-readable media of claim 15, wherein the one or more indications comprise one or more icons associated with the one or more in-game betting rights.

20. The one or more non-transitory computer-readable media of claim 15, wherein the processor executable instructions, when executed by the at least one processor, cause the at least one processor to cause the one or more user devices to launch one or more in-game betting applications.

21. An apparatus, comprising:
one or more processors; and
memory storing processor executable instructions that, when executed by the one or more processors, cause the apparatus to:
determine, based on received video content, one or more user device identifiers associated with one or more user devices to receive the video content;
determine, based on the video content, one or more in-game betting policies associated with the video content;
determine, based on the one or more in-game betting policies, one or more in-game betting rights associated the one or more user device identifiers; and
cause, causing, based on the one or more in-game betting rights, output of one or more indications of in-game betting availability on one or more user interfaces associated with the video content.

22. The apparatus of claim 21, wherein the one or more user devices comprise one or more set top boxes.

23. The apparatus of claim 21, wherein the processor executable instructions that, when executed by the one or more processors, cause the apparatus to determine the one or more in-game betting policies, further cause the apparatus to determine one or more wagering games associated with the video content.

24. The apparatus of claim 21, wherein the processor executable instructions that, when executed by the one or more processors, cause the apparatus to determine the one or more in-game betting policies, further cause the apparatus to determine one or more location-based gambling restrictions.

25. The apparatus of claim 21, wherein the one or more indications comprise one or more icons associated with the one or more in-game betting rights.

26. The apparatus of claim 21, wherein the processor executable instructions, when executed by the one or more processors, further cause the apparatus to cause the one or more user devices to launch one or more in-game betting applications.

27. The apparatus of claim 21, wherein the processor executable instructions, when executed by the one or more processors, further cause the apparatus to:
receive, from the one or more user devices, an in-game betting access request; and
cause, based on the in-game betting access request, the one or more user devices to download one or more application.

28. A system comprising:
a computing device configured to:
determine, based on received video content, one or more user device identifiers associated with one or more user devices to receive the video content;
determine, based on the video content, one or more in-game betting policies associated with the video content;
determine, based on the one or more in-game betting policies, one or more in-game betting rights associated the one or more user device identifiers; and
cause, based on the one or more in-game betting rights, output of one or more indications of in-game betting availability on one or more user interfaces associated with the video content; and
the one or more user devices configured to:
receive the video content.

29. The system of claim 28, wherein the one or more user devices comprise one or more set top boxes.

30. The system of claim 28, wherein the computing device is configured to determine the one or more in-game betting policies associated with the video content by determining one or more wagering games associated with the video content.

31. The system of claim 28, wherein the computing device is configured to determine the one or more in-game betting policies by determining one or more location-based gambling restrictions.

32. The system of claim 28, wherein the one or more indications comprise one or more icons associated with the one or more in-game betting rights.

33. The system of claim 28, wherein the computing device is further configured to cause the one or more user devices to launch one or more in-game betting applications.

34. The system of claim 28, wherein the computing device is further configured to:
receive, from the one or more user devices, an in-game betting access request; and
cause, based on the in-game betting access request, the one or more user devices to download one or more application.

35. One or more non-transitory computer-readable media storing processor executable instructions thereon, which, when executed by at least one processor cause the at least one processor to:
determine, based on video content for one or more user devices, one or more user device identifiers;
determine, based on the one or more user device identifiers, one or more in-game betting applications associated with the video content;
send, based on the one or more in-game betting applications, in the video content for the one or more user devices associated with the one or more user device identifiers, one or more content markers to the one or more user devices; and
cause, based on the one or more content markers, the one or more user devices to activate the one or more in-game betting applications.

36. The one or more non-transitory computer-readable media of claim 35, wherein the one or more user device identifiers are associated with one or more gaming policies.

37. The one or more non-transitory computer-readable media of claim 35, wherein the one or more in-game betting applications comprise one or more applets.

38. The one or more non-transitory computer-readable media of claim 35, wherein the processor executable instructions that, when executed by at least one processor, cause the at least one processor to send the one or more content markers, further cause the at least one processor to determine, based on the one or more user device identifiers, location data associated with the one or more user device identifiers.

39. The one or more non-transitory computer-readable media of claim 35, wherein the processor executable instructions that, when executed by at least one processor, cause the at least one processor to send the one or more content markers, further cause the at least one processor to send one or more SCTE messages to the one or more user devices.

40. The one or more non-transitory computer-readable media of claim 35, wherein the processor executable instructions that, when executed by at least one processor, cause the at least one processor to cause the one or more user devices to activate the one or more in-game betting applications, further cause the at least one processor to launch one or more interfaces.

41. The one or more non-transitory computer-readable media of claim 35, wherein the processor executable instructions, when executed by at least one processor, further cause the at least one processor to receive, from the one or more user devices, one or more user inputs associated with the one or more in-game betting applications.

42. An apparatus, comprising:
one or more processors; and
memory storing processor executable instructions that, when executed by the one or more processors, cause the apparatus to:
determine, based on video content for one or more user devices, one or more user device identifiers;
determine, based on the one or more user device identifiers, one or more in-game betting applications associated with the video content;
send, based on the one or more in-game betting applications, in the video content for the one or more user devices associated with the one or more user device identifiers, one or more content markers to the one or more user devices; and
cause, based on the one or more content markers, the one or more user devices to activate the one or more in-game betting applications.

43. The apparatus of claim 42, wherein the one or more user device identifiers are associated with one or more gaming policies.

44. The apparatus of claim 42, wherein the one or more in-game betting applications comprise one or more applets.

45. The apparatus of claim 42, wherein the processor executable instructions that, when executed by the one or more processors, cause the apparatus to send the one or more content markers, further cause the apparatus to determine, based on the one or more user device identifiers, location data associated with the one or more user device identifiers.

46. The apparatus of claim 42, wherein the one or more content markers comprise one or more SCTE messages.

47. The apparatus of claim 42, wherein the processor executable instructions that, when executed by the one or more processors, cause the apparatus to cause the one or more user devices to activate the one or more in-game betting applications further cause the apparatus to cause the one or more user devices to launch one or more interfaces.

48. The apparatus of claim 42, wherein the processor executable instructions, when executed by the one or more processors, further cause the apparatus to receive, from the one or more user devices, one or more user inputs associated with the one or more in-game betting applications.

49. A system comprising:
a computing device configured to:
determine, based on video content for one or more user devices, one or more user device identifiers;
determine, based on the one or more user device identifiers, one or more in-game betting applications associated with the video content;
send, based on the one or more in-game betting applications, in the video content for the one or more user devices associated with the one or more user device identifiers, one or more content markers to the one or more user devices; and
cause, based on the one or more content markers, the one or more user devices to activate the one or more in-game betting applications; and
the one or more user devices configured to:
activate the one or more in-game betting applications.

50. The system of claim 49, wherein the one or more user device identifiers are associated with one or more gaming policies.

51. The system of claim 49, wherein the one or more in-game betting applications comprise one or more applets.

52. The system of claim 49, wherein the computing device is configured to send the one or more content markers by determining, based on the one or more user device identifiers, location data associated with the one or more user device identifiers.

53. The system of claim 49, wherein the one or more content markers comprise one or more SCTE messages.

54. The system of claim 49, wherein the computing device is configured to cause the one or more user devices to activate the one or more in-game betting applications by causing the one or more user devices to launch one or more interfaces.

55. The system of claim 49, wherein the computing device is further configured to receive, from the one or more user devices, one or more user inputs associated with the one or more in-game betting applications.

* * * * *